J. L. HINDS & J. J. DOSSERT.
COUPLING FOR ELECTRIC CONDUCTORS.
APPLICATION FILED MAY 26, 1909.
1,094,717.
Patented Apr. 28, 1914.
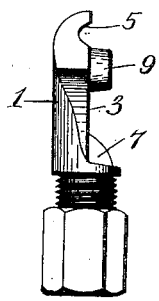
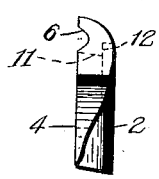
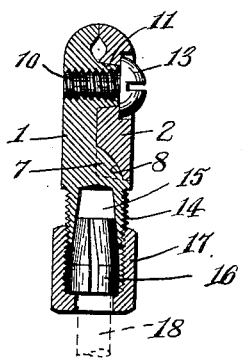
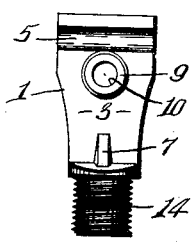
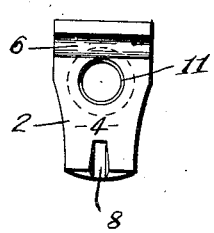
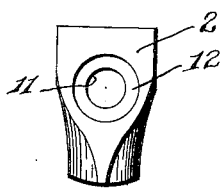
WITNESSES:
Chas H Young
E. R. Sumitter
INVENTORS.
Jesse L. Hinds
John J. Dossert
BY
Parsons Hall Bodell
ATTORNEYS

UNITED STATES PATENT OFFICE.

JESSE L. HINDS AND JOHN J. DOSSERT, OF SYRACUSE, NEW YORK, ASSIGNORS TO CROUSE-HINDS COMPANY, OF SYRACUSE, NEW YORK, A CORPORATION OF NEW YORK.

COUPLING FOR ELECTRIC CONDUCTORS.

1,094,717. Specification of Letters Patent. Patented Apr. 28, 1914.

Application filed May 26, 1909. Serial No. 498,413.

*To all whom it may concern:*

Be it known that we, JESSE L. HINDS and JOHN J. DOSSERT, of Syracuse, in the county of Onondaga and State of New York, have invented a certain new and useful Coupling for Electric Conductors, of which the following is a specification.

Our invention has for its object a particularly simple and efficient electrical coupling for connecting an electric conductor to another conductor arranged at an angle thereto, or for connecting an electric conductor to a suitable support, and it consists in the combinations and constructions hereinafter set forth and claimed.

In describing this invention, reference is had to the accompanying drawing in which like characters designate corresponding parts in all the views.

Figure 1 is a vertical section, partly in elevation, of one construction of our coupling. Figs. 2 and 3 are elevations of detached parts of said coupling. Fig. 4 is a view of the screw for connecting together the clamping members of the coupling. Fig. 5 is an inner face view of one of the clamping members, and Figs. 6 and 7 are inner and outer face views of the other clamping member.

This electrical coupling includes two clamping members 1, 2 having jaws formed with opposing flat surfaces 3, 4 provided at their free ends with means as transversely disposed grooves 5, 6 for receiving and clamping an electric conductor, as a wire or cable, not illustrated. The surface 3 provided on one of the clamping jaws of the coupling substantially intersects the longitudinal axis of the stem of said coupling and is formed at the intersection of its base with said stem with a lateral projection or lug 7 having flat sides arranged at right angles to said surface, and the surface 4 of the other clamping jaw is provided at its corresponding end with a recess 8 which receives and fits the projection 7, the side walls of the recess 8 being flat and engaging opposite sides of the projection 7. The surface 3 is provided with a truncated conical lug or boss 9 interposed between the groove 5 and the projection 7 and arranged adjacent said groove 5, and a threaded opening 10 extends in the same direction as the boss 9 and opens through the free end of said boss and the outer surface of the clamping member 1. The clamping member 2 is formed with an opening 11 which receives the boss 9, this opening 11 extending through opposite surfaces of the clamping member and having its outer end extended beyond the plane occupied by the end of the boss 9 and formed of enlarged diameter and provided with an annular engaging shoulder or face 12. A screw 13 serves to draw together the clamping members 1 and 2 for clamping an electric conductor in the grooves 5, 6 and also serves to hold the clamping members in their adjusted position, the stem of the screw engaging the threaded opening 10 and its head engaging the shoulder 12, the projection 7 and the recess 8 restraining any tendency of the clamping member 2 to move about the axis of the screw 13 and coöperating with said screw to hold the clamping member 2 in its adjusted position.

It will be understood that the boss 9, the threaded opening 10 extending therethrough and the projection 7 may be provided upon the clamping member 2, and that the clamping member 1 may be formed with the opening 11 and the socket 8 for respectively receiving said boss and projection.

As seen in Fig. 1 one of the clamping members, as 1, is provided with a cylindrical externally-threaded portion or stem 14 having an axial tapering socket 15 opening through the free end of said stem and receiving the tapering end of a suitable expansible and compressible sleeve 16, such as that shown in the pending application of Jesse L. Hinds, Sr. No. 487,125, and a hollow nut 17 screws upon such stem and engages one end of the sleeve 16 for clamping the sleeve upon any suitable conductor, as 18, indicated by dotted lines and passed axially through one end of the nut 17 and the sleeve 16. If desired, the part engaged by the sleeve 16 may be a suitable support instead of an electric conductor, and the sleeve 16 may serve merely to secure the electrical coupling to a support; or the electrical coupling may be provided with any other desirable means for securing the same to a suitable support.

What we claim is:—

In an electrical coupling, a stem having means at one end for attachment to a support, and a clamping jaw at its opposite end, said jaw having a flat face located in a plane substantially intersecting the longitudinal axis of the stem and being provided near its outer end with a transversely disposed groove, a truncated conical lug located on the face and adjacent the groove, a second lug located at an intersection of the face with the stem, said jaw being provided with a transversely extending threaded opening disposed with its axis in alinement with the longer axis of the first-named lug, and extending through the end of the latter, a second clamping jaw having a flat face complemental to the corresponding face of the first-named jaw, and having a groove complemental to the first-named groove; a recess complemental to the second-named lug and a transverse opening of two diameters, the part of said opening of smaller diameter being complemental to the first-named lug, and the part of the opening of larger diameter providing an annular shoulder, and a screw having a stem portion for engaging the transverse opening in the first-named jaw, and a head engaging said annular shoulder, substantially as and for the purpose described.

In testimony whereof, we have hereunto signed our names in the presence of two attesting witnesses, at Syracuse, in the county of Onondaga, in the State of New York, this 24th day of May, 1909.

JESSE L. HINDS.
JOHN J. DOSSERT.

Witnesses:
S. DAVIS,
E. K. SEEMILLER.